United States Patent [19]

Ohmori et al.

[11] Patent Number: 4,585,306
[45] Date of Patent: Apr. 29, 1986

[54] OPTICAL MATERIALS

[75] Inventors: Akira Ohmori, Ibaraki; Nobuyuki Tomihashi, Takatsuki; Kiyohiko Ihara, Suita, all of Japan

[73] Assignee: Daikin Kogyo Co. Ltd., Japan

[21] Appl. No.: 667,056

[22] Filed: Oct. 31, 1984

Related U.S. Application Data

[63] Continuation of Ser. No. 476,482, Mar. 18, 1983, abandoned.

[30] Foreign Application Priority Data

Mar. 25, 1982 [JP] Japan ................... 57-48498

[51] Int. Cl.$^4$ ..................... C08F 210/02; G02B 5/14
[52] U.S. Cl. .................... 350/96.34; 526/247; 526/249; 526/253; 526/254; 526/255
[58] Field of Search ............... 526/247, 249, 253, 254, 526/255; 350/96.29, 96.30, 96.33, 96.34

[56] References Cited

U.S. PATENT DOCUMENTS

| | | | |
|---|---|---|---|
| 3,624,250 | 11/1971 | Carlson | 526/247 |
| 3,641,332 | 2/1972 | Reick et al. | 264/1 |
| 3,654,245 | 4/1972 | Kometani et al. | 526/249 |
| 3,817,951 | 6/1974 | Robinson | 526/254 |
| 3,920,980 | 11/1975 | Nath | 350/96 R |
| 3,989,873 | 11/1976 | Robertson et al. | 526/249 |
| 4,166,165 | 8/1979 | Hisasue et al. | 526/247 |
| 4,170,686 | 10/1979 | Miller et al. | 526/247 |
| 4,381,387 | 4/1983 | Sulzbach | 526/253 |

*Primary Examiner*—Harry Wong, Jr.
*Attorney, Agent, or Firm*—Larson and Taylor

[57] ABSTRACT

An optical material comprising a copolymer of:
(1) ethylene,
(2) at least one of tetrafluoroethylene and chlorotrifluoroethylene and
(3) olefin having at least one fluoroalkyl group,
and a cladding material as used in assembling an optical fiber which comprises the copolymer as defined in above.

2 Claims, No Drawings

OPTICAL MATERIALS

This application is a continuation of application Ser. No. 476,482 filed Mar. 18, 1983, and now abandoned.

This invention relates to novel optical materials for claddings of optical fibers, contact lenses, films for solar collectors, light-resistant transparent films, etc.

Conventional fluoroolefin-type polymers with high transparency other than elastic materials include tetrafluoroethylene-hexafluoropropylene copolymer, chlorotrifluoroethylene polymer, vinylidene fluoride polymer, vinylidene fluoride-tetrafluoroethylene copolymer, etc. However, these polymers when used as optical materials for optical fibers, films for solar collectors or the like are unacceptably low in transparency and high in refractive index. In recent years, attention has been directed to optical fibers as good optical materials and there are demands for cladding materials for optical fibers which materials have high transparency and low refractive index.

There have been used two types of optical fibers which are different from each other in the substrate contained therein for transmission of light rays: one type containing glass as the substrate and the other containing synthetic resin as the substrate. Cladding materials as used in assembling an optical fiber must possess low refractive index, high transparency and good durability. Polystyrene, polymethacrylate and the like are generally used as the core materials for optical fibers containing synthetic resin as the substrate.

The cladding material for an optical fiber which surrounds the core thereof must have, above all, low refractive index because greater differences in refractive index between the cladding and the core result in the transmission of information in larger amounts. The transparency of the cladding affects light loss so that a material with high transparency leads to lower light loss, enabling the long-range transmission of light beams and also the increase in the space between amplifiers arranged for an optical communication system, hence commercially advantageous.

Among the fluoroolefin-type polymers, the ethylene-tetrafluoroethylene copolymer has a high degree of crystallinity and melts at a temperature of 260° to 270° C., but lacks suitable refractive index and transparency for optical materials.

It is an object of the present invention to provide optical materials having excellent transparency and, above all, cladding materials of high transparency for optical fibers.

It is another object of the invention to provide optical materials having low refractive index and, above all, cladding materials of low refractive index for optical fibers.

It is a further object of the invention to provide optical materials having high transparency, low refractive index, good light resistance and excellent chemical resistance, and, above all, cladding materials with these properties for optical fibers.

It is an additional object of the invention to provide optical materials suitable as heat-insulating and light-transmittable films for use with solar collectors.

Other features of the present invention will become apparent from the following description.

The foregoing objects of the present invention can be achieved by using as an optical material a copolymer comprising (1) ethylene, (2) at least one of tetrafluoroethylene and chlorotrifluoroethylene and (3) olefin having a fluoroalkyl group(s).

We conducted research and found that the copolymer comprising the components (1) to (3) has excellent transparency, low refractive index, and high light resistance and chemical resistance and possess properties suitable for cladding materials of optical fibers and that the copolymer is useful in manufacturing heat-insulating and light-transmittable films for solar collectors particularly due to the remarkable light resistance and chemical resistance. The copolymer itself was known, but it was unknown to use the copolymer as the component for these types of optical materials. In short, the copolymer was heretofore unknown as an optical material.

The olefin having the fluoroalkyl group(s) (hereinafter referred to as fluoroalkyl-containing olefin) to be used in the present invention is represented by the formula

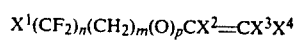

wherein $X^1$ represents hydrogen, fluorine or

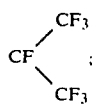

$X^2$ represents hydrogen, fluorine or trifluoromethyl; $X^3$ and $X^4$ are the same or different and represent hydrogen or fluorine; n is an integer of 1 to 6; m is 0 or 1; and p is 0 or 1. The olefin of the formula is fluoroolefin or fluorovinyl ether containing at least 40% by weight of fluorine.

The fluorine content of the olefin must be at least 40% by weight and preferably ranges from 45 to 72% by weight. With the fluorine content of less than 40%, higher refractive index results. Conversely the fluorine content of more than 72% leads to difficulty in polymerization.

Examples of useful olefins are 3,3,3-trifluoropropylene, 3,3,3-trifluoro-2-chloropropylene, 3,3,3-trifluoromethylvinyl ether, pentafluoropropylene, perfluoropropylene, perfluoromethylvinyl ether, ω-hydro-3,3,4,4-tetrafluorobutene-1, ω-hydro-3,3,4,4,5,5,6,6-octafluorohexene-1, 1,1,2,8-tetrahydroperfluorooctene, 1,1,2,2,-tetrafluoroethylvinyl ether, 2,2,3,3-tetrafluoropropylvinyl ether, 1,1,2,2,3,3,4,4-octafluorobutylvinyl ether, 2,2,3,3,4,4,5,5-octafluoropentylvinyl ether, 6-hydroperfluorohexylvinyl ether, 1,1,2-trihydroperfluoroheptene-1, 3,3,3-trifluoro-2-trifluoromethylpropene, perfluorobutene-1, perfluoropentene-1, perfluorohexene-1, perfluoroheptene-1, ω-hydroperfluorobutene-1, ω-hydroperfluorohexene-1, etc.

Preferably about 1 to about 30 mol %, more preferably about 5 to about 25 mol %, of the fluoroalkyl-containing olefin is copolymerized with the ethylene and the tetrafluoroethylene and/or chlorotrifluoroethylene to form a copolymer. When using less than 1 mol % of the olefin, the copolymer is prepared with less improved index of refraction and transparency. With more than 30 mol % thereof, the copolymer becomes elastic like rubber and less durable.

The contents of the ethylene and tetrafluoroethylene and/or chlorotrifluoroethylene in the present copolymer can be determined over a wide range. It is preferred, however, to use 30 to 60 mol % of ethylene, 20 to 70 mol % of tetrafluoroethylene and/or chlorotrifluoroethylene and 1 to 30 mol % of fluoroalkyl-containing olefin, which gives a copolymer excellent in any of refractive index, transparency and durability. Less than 30% of ethylene leads to reduced mechanical strength and over 60% thereof to increased refractive index, hence undesirable.

The process for preparing the copolymer of the present invention is not limited to a particular mode. The present copolymer can be formed with high efficiency, for example, by the suspension polymerization method or emulsion polymerization method which is described in Japanese Examined Patent Application No. 24072/1977.

The copolymer of the present invention can be easily united with polystyrene, polymethacrylate or like synthetic resin core materials, thereby giving optical fibers with low refractive index, good transparency and extremely high durability. The present copolymer can be used at 200° to 300° C. to form a laminate film comprising layers of the present copolymer and commonly used resin or to manufacture a product by composite extrusion. Therefore, the copolymer finds extensive applications in manufacturing a variety of commercial products.

The present invention will be described below in more detail with reference to examples.

EXAMPLE 1

Into a 3000 ml pressure-resistant reactor was placed 1000 ml of ion-exchanged water. After fully replacing the air in the reactor with nitrogen, 1000 g of 1,2,2-trifluorotrichloroethane was charged at increased pressure into the reactor. The temperature in the reactor was adjusted to 20° C. and a gas mixture of ethylene, tetrafluoroethylene and hexafluoropropene (hereinafter referred to as E, TFE and HFP, respectively) in a 15:16:69 mole ratio was forced into the reactor to elevate the pressure in the reactor to 8.5 Kg/cm$^2$G.

A 5 ml portion of 1,2,2-trifluorotrichloroethane solution (0.33 g/ml) of di (trichloroperfluorohexanoyl) peroxide as a catalyst was placed at increased pressure into the reactor to commence polymerization. When the pressure decreased to 8 Kg/cm$^2$G, an E-TFE gas mixture in a 57:43 mole ratio was fed at increased pressure to the reactor to raise the pressure to 8.5 Kg/cm$^2$G. By replenishing the reactor with required amounts of monomers, the pressure of 8.5 Kg/cm$^2$G was maintained to continue 6 hours of polymerization.

After evacuation of the gases remaining in the reactor, the copolymer thus obtained was fully washed with warm water to provide 150 g of white powder. The white powder melts at 190° C. and was found to be an E-TFE-HFP copolymer in a 55:25:20 mole ratio by elementary analysis, infrared analysis and gas chromatograph analysis.

The copolymer was made at 300° C. int a 2 mm-thick sheet and tested for transparency by an auto-recording spectrophotometer (556 Model with a wavelength of 805 nm, product of Hitachi, Ltd., Japan). Table 1 given below shows the results of the test and the other properties of the copolymer.

EXAMPLE 2

Into a 3000 ml pressure-resistant reactor was placed 1000 ml of ion-exchanged water. After fully replacing the air in the reactor with nitrogen, 1000 g of 1,2,2-trifluorotrichloroethane was charged at increased pressure into the reactor. The temperature in the reactor was adjusted to 20° C. and a gas mixture of E, TFE and 3,3,3-trifluoropropene (herinafter referred to as TFP) in a 28.7:66.0:5.3 mole ratio was forced into the reactor to elevate the pressure to 4 Kg/cm$^2$G.

A 5 ml portion of 1,2,2-trifluorotrichloroethane solution (0.33 g/ml) of di (trichloroperfluorohexanoyl) peroxide as a catalyst was placed at increased pressure into the reactor to commence polymerization. Then an E-TFE-TFP gas mixture in a 46:49:5 mole ratio was supplied to maintain the initial pressure of 4 Kg/cm$^2$G for 3.5-hour polymerization.

After removal of the remaining gases, the copolymer thus formed was fully washed with warm water to provide 50 g of a copolymer. The copolymer melts at 240° C. and was found to be an E-TFE-TFP copolymer in a 48:45:7 mole ratio by the same analytical methods as in Examples 1. Table 1 below shows the properties of the copolymer.

EXAMPLE 3

The procedure as in Example 2 was repeated except that 3,3,3-trifluoromethylpropene (hereinafter referred to as TFMP) was used in place of the 3,3,3-trifluoropropene, giving an E-TFE-TFMP copolymer in a 48:34:18 mole ratio. Table 1 below shows the properties of the copolymer.

EXAMPLES 4 to 8

Copolymers were prepared by following the procedure of Example 2 using varying fluoroalkyl-containing olefins listed in Table 1 below which also shows the properties and the compositions of the copolymers.

COMPARISON EXAMPLE 1

An E-TFE copolymer in a 48:52 mole ratio was prepared by repeating the procedure of Example 1 with the exception of not using HFP. Table 2 below shows the properties of the copolymer.

COMPARISON EXAMPLES 2 and 3

Two copolymers were produced in the same manner as in Example 1 using two kinds of fluoroalkyl-containing olefins listed in Table 2 below. The properties of the copolymers are tabulated in Table 2 below.

TABLE 1

| Example | Fluoroalkyl-containing olefin (FO) | Composition (mol %) E-TFE-FO | Refractive index | Transparency (%) |
|---|---|---|---|---|
| 1 | Hexafluoropropene | 55:25:20 | 1.38 | 90 |
| 2 | 3,3,3-trifluoropropene | 48:45:7 | 1.40 | 87 |
| 3 | 3,3,3-trifluoro-2-trifluoromethylpropene | 54:36:10 | 1.39 | 91 |
| 4 | Perfluoromethylvinyl ether | 52:38:10 | 1.39 | 88 |
| 5 | 3,3,3-trifluoro-2-fluoropropene | 51:34:15 | 1.39 | 92 |
| 6 | 1,1,2,2,3,3,4,4-octafluorobutylvinyl ether | 49:43:8 | 1.38 | 89 |
| 7 | Perfluoropentene-1 | 53:41:6 | 1.39 | 88 |
| 8 | Perfluoroethylvinyl ether | 48:45:7 | 1.39 | 90 |

TABLE 2

| Comparison Example | Fluoroalkyl-containing olefin (FO) | Composition (mol %) E-TFE-FO | Refractive index | Transparency (%) | Remark |
|---|---|---|---|---|---|
| 1 | — | 48:52 | 1.42 | 70 | |
| 2 | Perfluoromethylvinyl ether | 45:20:35 | 1.36 | 92 | Elastic like rubber (less durable) |
| 3 | Hexafluoropropene | 70:23:7 | 1.43 | 78 | |

EXAMPLE 9

Ion-exchanged water (1000 ml) was placed into a 3000 ml pressure-resistant reactor which was then sealed. The oxygen remaining in the reactor was fully removed and 800 g each of dichlorotetrafluoroethane and hexafluoropropene (HFP) was placed at increased pressure into the reactor and stirred at 25° C. An ethylene-chlorotrifluoroethylene (hereinafter referred to as CTFE) gas mixture in an 1:4 mole ratio was forced into the reactor to elevate the pressure to 10 Kg/cm²G.

A 5 ml portion of 1,2,2-trifluorotrichloroethane solution (0.43 g/ml) of di(trichloroperfluorohexanoyl) peroxide as a catalyst was added at increased pressure to initiate polymerization. When the pressure was reduced to 9.5 Kg/cm²G, an E-CTFE gas mixture in a 7:3 mole ratio was introduced at increased pressure to elevate the pressure to 10 Kg/cm²G. The same pressurization was repeated to perform 7 hours of polymerization.

After removal of the remaining gases from the reactor, the copolymer was withdrawn and fully washed with warm water. Drying the copolymer provided white powder. The white powder melts at 187° C. and was found to be an E-CTFE-HFP copolymer in a 40:36:24 mole ratio. The copolymer was made at 250° C. into a 2 mm-thick sheet and checked for transparency by an auto-recording spectrophotometer, 556 Model of Hitachi, Ltd., Japan. Table 3 below shows the properties of the copolymer.

EXAMPLE 10

Ion-exchanged water (1000 ml) was placed into a 3000 ml pressure-resistant reactor which was then sealed. After complete evacuation of the oxygen remaining in the reactor, 800 g each of dichlorotetrafluoroethane and TFP were forced into the reactor. The temperature was adjusted to 25° C. with stirring and an E-CTFE-TFP gas mixture in a 20:65:15 mole ratio to increase the pressure to 10 Kg/cm²G. The same catalyst as in Example 9 was charged at increased pressure into the reactor in the same amount to start polymerization.

A 6-hour polymerization was conducted by adding an E-CTFE-TFP gas mixture in a 50:35:15 mole ratio to retain the level of the pressure.

After discharge of the remaining gases, the copolymer thus obtained was withdrawn and fully washed with warm water. Subsequent drying provided white powder. The powder melts at 200° C. and was found to be an E-CTFE-TFP copolymer having a 51:33:16 mole ratio. Table 3 below indicates the properties of the copolymer.

EXAMPLES 11 to 18

Copolymerization was conducted in the same manner as in Examples 9 by using a variety of fluoroalkyl-containing olefins listed in Table 3 below which also indicates the compositions and properties of the copolymers thus formed.

COMPARISON EXAMPLE 4

An E-CTFE copolymer in a mole ratio of 52:48 was formed in the same manner as in Example 9 with the exception of not using HFP. Table 4 below shows the properties of the copolymer.

COMPARISON EXAMPLES 5 and 6

Copolymers were prepared in the same manner as in Example 9 with the exception of employing fluoroalkyl-containing olefins listed in Table 4 below also indicating the compositions and the properties of the copolymers.

TABLE 3

| Example | Fluoroalkyl-containing olefin (FO) | Composition (mol %) E-CTFE-FO | Refractive index | Transparency (%) |
|---|---|---|---|---|
| 11 | Hexafluoropropene | 40:36:24 | 1.39 | 91 |
| 12 | 3,3,3-trifluoropropene | 51:33:16 | 1.42 | 87 |
| 13 | 3,3,3-trifluoro-2-trifluoromethylpropene | 48:39:13 | 1.40 | 90 |
| 14 | Perfluoromethylvinyl ether | 50:40:10 | 1.41 | 91 |
| 15 | 3,3,3-trifluoro-2-fluoropropene | 49:33:18 | 1.41 | 86 |
| 16 | 1,1,2,2,3,3,4,4-octafluorobutylvinyl ether | 51:41:8 | 1.40 | 89 |
| 17 | Perfluoropentene-1 | 52:39:9 | 1.41 | 88 |
| 18 | Perfluoroethylvinyl ether | 48:45:7 | 1.41 | 87 |

TABLE 4

| Comparison Example | Fluoroalkyl-containing olefin (FO) | Composition (mol %) E-CTFE-FO | Refractive index | Transparency (%) | Remark |
|---|---|---|---|---|---|
| 4 | — | 52:48 | 1.43 | 62 | |
| 5 | Perfluoromethylvinyl ether | 40:22:38 | 1.36 | 92 | Elastic like rubber (less durable) |
| 3 | Hexafluoropropene | 71:24:5 | 1.44 | 75 | |

We claim:
1. In an optical fiber comprising a cladding and a core, the improvment wherein said cladding comprises a copolymer consisting essentially of
(1) 30 to 60 mol % of ethylene,

(2) 20 to 70 mol % of at least one member selected from the group consisting of tetrafluoroethylene and chlorotrifluoroethylene, and (3) 1 to 30 mol % of olefin having at least one fluoroalkyl group represented by the formula $$X^1(CF_2)_n(CH_2)_m(O)_pCX^2=CX^3X^4$$

wherein $X^1$ represents hydrogen, fluorine or

$X^2$ represents hydrogen, fluorine or trifluoromethyl; $X^3$ and $X^4$ are the same or different and represent hydrogen or fluorine; n is an integer of 1 to 6; m is 0 or 1; and p is 0 or 1.

2. In an optical fiber as defined in claim 1 wherein said olefin is selected from the group consisting of hexafluoropropene, 3,3,3-trifluoropropene, 3,3,3-trifluoro-2-trifluoromethylpropene, perfluoromethylvinyl ether, 3,3,3-trifluoro-2-fluoropropene, 1,1,2,2,3,3,4,4-octafluorobutylvinyl ether, perfluoropentene-1 and perfluoroethylvinyl ether.

* * * * *